United States Patent [19]
Mitchell et al.

[11] Patent Number: 4,904,393
[45] Date of Patent: Feb. 27, 1990

[54] METHOD FOR CONTROLLING OVERSPRAY IN PAINT SPRAY BOOTHS

[75] Inventors: David B. Mitchell, Palatine; Thomas P. Curran, Lake Zurich, both of Ill.

[73] Assignee: W. R. Grace & Co.-Conn., New York, N.Y.

[21] Appl. No.: 199,969

[22] Filed: May 27, 1988

[51] Int. Cl.⁴ .............................................. C02F 1/56
[52] U.S. Cl. ................... 210/712; 210/725; 210/727; 210/728; 55/85
[58] Field of Search ............ 55/84, 85; 134/38; 210/705, 712, 725, 727, 728, 730, 734–736; 427/331

[56] References Cited

U.S. PATENT DOCUMENTS

| | | | |
|---|---|---|---|
| 2,345,543 | 3/1944 | Wohnsiedler et al. | 260/72 |
| 2,485,079 | 10/1949 | Wohnsiedler et al. | 260/29.4 |
| 2,820,777 | 1/1958 | Suen et al. | 260/89.7 |
| 3,288,770 | 11/1966 | Butler | 260/88.3 |
| 3,515,575 | 6/1970 | Arnold | 55/84 |
| 3,738,945 | 6/1973 | Panzer et al. | 260/2 BP |
| 3,861,887 | 1/1975 | Forney | 55/19 |
| 3,953,330 | 4/1976 | Tonkyn et al. | 210/736 |
| 3,990,869 | 11/1976 | Forney | 55/19 |
| 3,990,986 | 11/1976 | Gabel et al. | 252/315 |
| 4,002,490 | 1/1977 | Michalski et al. | 134/38 |
| 4,055,495 | 10/1977 | Gabel et al. | 210/728 |
| 4,440,647 | 4/1984 | Puchalski | 210/712 |
| 4,504,395 | 3/1985 | Harpel et al. | 210/712 |
| 4,548,967 | 10/1985 | Brown et al. | 524/56 |
| 4,554,026 | 11/1985 | Cosper et al. | 134/38 |
| 4,558,080 | 12/1985 | Quamme et al. | 524/72 |
| 4,563,199 | 1/1986 | Lindenberger et al. | 55/85 |
| 4,564,464 | 1/1986 | Harpel et al. | 252/181 |
| 4,600,513 | 7/1986 | Mizutani et al. | 210/712 |
| 4,629,572 | 12/1986 | Lietz et al. | 210/714 |
| 4,637,824 | 1/1987 | Pominville | 55/85 |
| 4,656,059 | 4/1987 | Mizuno et al. | 210/729 |
| 4,686,047 | 8/1987 | Arots | 210/712 |
| 4,715,962 | 12/1987 | Bhattacharyya et al. | 210/708 |
| 4,753,738 | 6/1988 | Huang | 210/727 |

FOREIGN PATENT DOCUMENTS 2185739 7/1987 United Kingdom .

Primary Examiner—Peter Hruskoci
Attorney, Agent, or Firm—James P. Barr

[57] ABSTRACT

A composition and method for detackifying paint spray booth water containing particles from paint spray is disclosed which uses a reaction product of an aldehyde with either a urea or an aminotriazine or both, and at least one of;

(i) a hydrolyzed polyacrylamide;
(ii) certain modified tannins in further combination with diallyldialkyl quaternary ammonium polymers or polymers derived by reacting certain dialkylamines with epihalohydrins.

18 Claims, 1 Drawing Sheet

METHOD FOR CONTROLLING OVERSPRAY IN PAINT SPRAY BOOTHS

FIELD OF THE INVENTION

This invention relates to treatment of paint spray booth wastes and in particular to treatment of waste paint accumulated in spray booth process water using treatment formulations which prevent agglomeration of paint spray particles.

BACKGROUND OF THE INVENTION

Commercial paint spraying operations are typically performed in spray painting booths. During these operations, less than half of the paint used may actually coat the surface to be painted, with the remainder representing overspray. In the spray application of polyurethanes, epoxy resins, lacquers, enamels, and additional coatings, it is normally necessary to trap the oversprayed coating materials in some way to avoid their building up on the walls and exhaust system surfaces of the spray booth. In many large industrial installations, including especially auto body painting systems, this is accomplished by the use of water curtains on the interior booth walls, whereby the oversprayed coating material is trapped in water which cascades down the walls of the booth and lies underneath it. Normally this water is recirculated over the walls from a reservoir of water underneath the booth or in close proximity to it by means of pumps which are capable of moving a large flow of water through large diameter pipes. However, the agglomeration and accumulation of live coating material in the water supply of these installations results in serious problems, such as blockage of the pipes and pumps which circulate the water, and a build-up of paint on the walls of the booth beyond the water curtain. As more and more coating material is sprayed in the booth, the material removed from the air builds up in the water in the form of a tar-like coherent sludge which in a short time can foul the pumps and lines which circulate the booth's water. Furthermore, this sludge is extremely difficult to remove from the pump, lines, reservoir, and other internal surfaces of the system with which it comes in contact. The accumulation of raw paint masses in the bottom of the water reservoir also creates a serious problem when the system is periodically cleaned out, much effort being required to remove the heavy build-up of coating material on the bottom of the reservoir.

It is, therefore, desirable to treat the water in the booth in such a way as to render the oversprayed coating material free of stickiness and tackiness so that it will readily separate itself from the water, not adhere to the curtain walls, pipes, pumps and other internals of the spray booth system, and remain as a detackified floating sludge.

One approach to detackification has been to combine certain polymeric materials with amphoteric metals. Thus, for example, U.S. Pat. No. 3,861,887 discloses treatment of paint booth wash water with a blend of polycationic water dispersible polymer with a water-soluble salt of an amphoteric metal to reduce the tackiness of paint. One problem with this approach is that use of metals, such as zinc, can create additional disposal concerns for the wastewater and sludge recovered from it.

Another approach has been to use clay-based treatment. For example, U.S. Pat. No. 4,504,395 discloses that certain hectorite clays can be effectively used to detackify oversprayed paint. A problem with this approach is that the sludge produced using clays can be difficult to dewater, resulting in larger volumes of potentially hazardous materials requiring haul-out to a secure landfill.

Other approaches using various treatments have also reportedly been considered. However, there remains a need for effective paint spray treatment which detackifies paint overspray and which does not aggravate waste sludge disposal problems. Moreover, some paint spray facilities have found that predilution of paints with various organic solvent combinations, for example, methylethyl ketone, toluene, xylene, etc. can be practiced advantageously to improve the coating finish and economize upon paint wastage, and paint spray treatment which can effectively detackify overspray containing prediluted paint formulations can be especially valuable.

SUMMARY OF THE INVENTION

In accordance with this invention, oversprayed paint particles in paint spray booth water is detackified by using in combination: (a) a first component selected from the group consisting of reaction products of an aldehyde with either a urea or an aminotriazine, or both; and (b) a second component selected from the group consisting of (i) anionic hydrolyzed polyacrylamides and (ii) reaction products of a condensed tannin with both an aldehyde and an amino compound in further combination with either certain diallyldialkyl quaternary ammonium polymers or polymers derived by reacting dimethylamine, diethylamine, or methylethylamine with an epihalohydrin. This combination provides extremely effective control of paint spray booth wastes, particularly at a pH between about 8 and about 11, and can serve as the basis for a paint spray control program which is organic in nature. Indeed, the preferred combination is free of clays which can present considerable dewatering problems, and free of amphoteric metals, such as zinc, which can present waste disposal concerns. Conventional dewatering aids such as hydrolyzed polyacrylamide polymer can be used to enhance coagulation and/or dewatering.

It is an object of this invention to inhibit the accumulation of paint within the eliminators, recirculation pumps, sludge tanks, water curtains, and other equipment of paint spray booth apparatus.

It is another object of the invention to provide for improved removal of detackified paint from an aqueous system.

It is a further object of this invention to provide a treatment for paint spray facilities employing paints which have been prediluted with organic solvent formulations.

It is still another object of this invention to provide a detackified sludge which is readily dewatered.

It is yet another object of this invention to provide for detackification which can be practiced without relying on toxic metals as essential components.

These and other objects and advantages of the present invention will become apparent from the following detailed description of the invention.

DETAILED DESCRIPTION OF THE INVENTION

Figure 1:
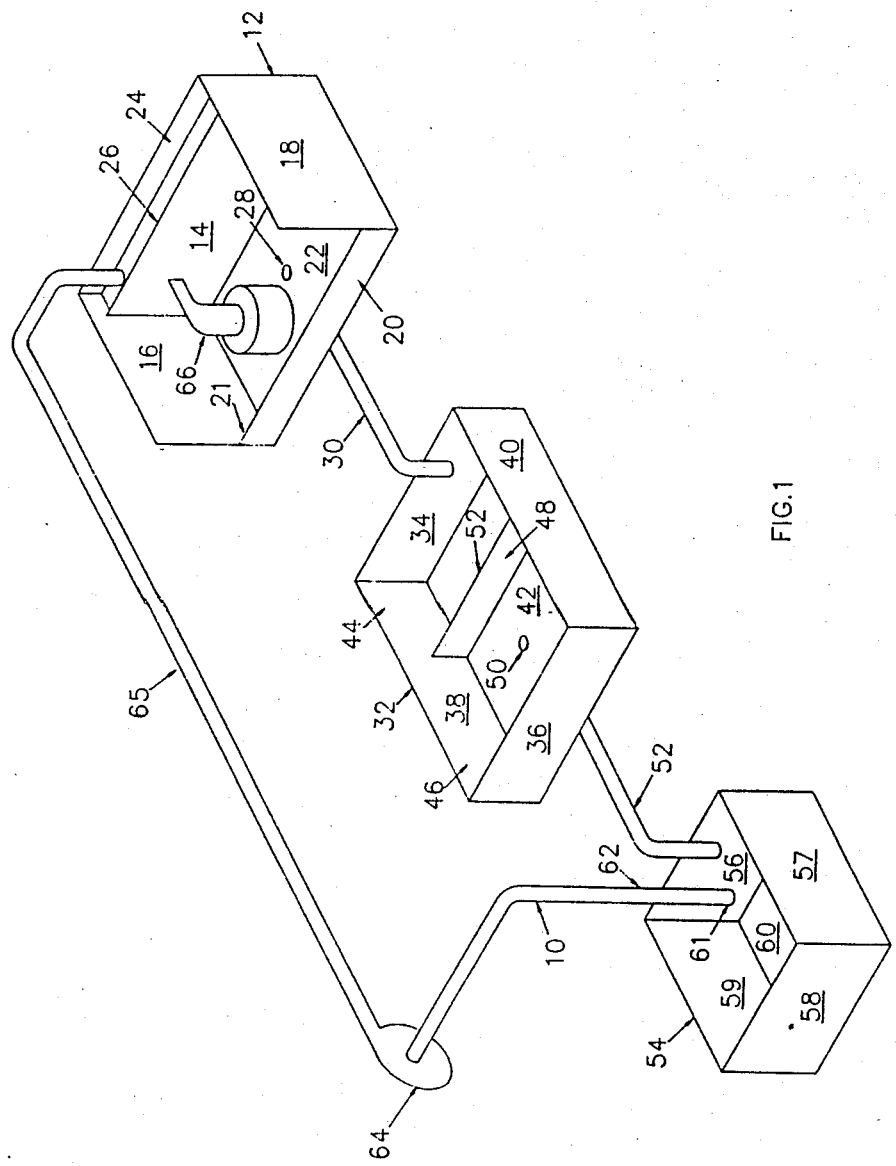
FIG. 1 is a schematic isometric drawing of an apparatus used for evaluating control of paint overspray.

The present invention is directed to the use of two components, each comprising selected organic compounds, in combination to achieve advantageous detackification of paint spray booth wastes. The combinations are generally most useful for detackifying epoxy resin paints, polyurethane paints, and at water alkalinities of at least about 150 ppm as $CaCO_3$, for detackifying high solids enamel paints which may be prediluted with organic solvents. Embodiments which are useful at water alkalinity levels below 150 ppm as $CaCO_3$ are also provided herein. Organic solvents used for predilution of enamel paints may include, for example, methylethyl ketone, hexane, xylene, toluene, acetone, butanol, or a combination of these and other conventional paint solvents.

One of those components is selected from certain products derived by reacting aldehydes with certain nitrogen-containing compounds which condense with aldehydes. Certain of these materials are described in U.S. Pat. No. 4,629,572 which is incorporated herein by reference. The preferred aldehyde for preparing these condensates is formaldehyde, although other aldehydes, such as acetaldehyde, acrolein, crotonaldehyde, etc. may be used. Formaldehyde may be used in the gaseous state or in one of its polymer forms, such as paraformaldehyde or formalin.

The nitrogen-containing compound may be resin-forming urea or a resin-forming aminotriazine, such as urea, melamine, thiourea, guanidine, dicyandiamide, dicyanamidine, alkylureas, cyclic alkyleneureas, aminotriazines other than melamine, such as melam, melem, ammelide, and ammeline, substituted melamines, such as butylmelamine or phenylmelamine, guanamines, such as acetoguananamine, benzoguanamine, tetra hydrobenzoguanamine, stearoguanamine, etc. The preferred nitrogen-containing resin-forming compounds are urea, melamine and mixtures of these. The preferred resins are urea-formaldehyde resin, melamine-formaldehyde resin and urea-melamineformaldehyde resin. In this discussion the nitrogen compound will simply be referred to as melamine, and formaldehyde will be used as representative of the aldehyde component.

As indicated in U.S. Pat. No. 4,629,572, suitable water-dispersible melamine-formaldehyde resins can be prepared by reacting formaldehyde and melamine in the ratio of about 1 to 10 and usually about 2 to 8 moles of formaldehyde per mole of melamine. The product may be made cationic by reaction with an acid such as hydrochloric acid. The preparation of melamine-formaldehyde resin is not a part of the invention. Any of the well-known melamine-formaldehyde products available on the market may be used in the invention or, if desired, particular melamine-formaldehyde resins may be made. Melamine formaldehyude compounds which may be used in this invention include those formed by reacting melamine with formaldehyde, for example, in the manner disclosed in U.S. Pat. No. 2,345,543 which is incorporated herein by reference; or by reacting both melamine and urea with formaldehyde in the manner described in U.S. Pat. No. 2,485,079 which is also incorporated herein by reference. The melamine-formaldehyde resin is cured sufficiently to render the product water-dispersible but is not cured so hard as to form an insoluble and infusible product. The melamine-formaldehyde resin is usually used in the form of a colloidal suspension achieved by raising the pH of the booth water to about 10.0 with caustic. Typically, when aminotriazoleformaldehyde derivatives are used in accordance with this invention, they have a molecular weight between about 5,000 and 20,000 and a charge density between about 1.0 and 25.0 milliequivalents per gram (meq/g).

The second component may be a slightly anionic hydrolyzed acrylamide of the general type that is disclosed in U.S. Pat. No. 2,820,777 which is hereby incorporated herein by reference. These polymeric materials contain both amide and carboxylate groups.

When anionic hydrolized polyacrylamides are used as the second component in accordance with this invention, they preferably have a molecular weight between about 12 million and about 15 million, and a charge density between about $-0.2$ and $-1.5$ meg/g/meg/g.

Practice of this embodiment of the invention will be further apparent from the following non-limiting example:

EXAMPLE I

The effectiveness of the combinations of this invention in detackifying paint overspray was evaluated using the paint spray apparatus depicted schematically in FIG. 1. The apparatus (10) comprises a spray chamber (12) which has a front wall (14), side walls (16) and (18), a rear wall (20) and a floor (22). An elevated reservoir (24) is positioned at the front wall (14) with the top edge (26) of the front wall forming the lowest side of the reservoir such that wastes overflowing from the reservoir form a water curtain for the front wall (14).

An outlet (28) is provided in the spray chamber floor (22), and water overflowing from the reservoir passes into outlet (28) and through piping (30) to the second mixing chamber (32). The mixing chamber (32) comprises end walls (34) and (36), side walls (38) and (40), and floor (42), and is divided into a first compartment (44) and a second compartment (46) by a weir (48). Water flowing from piping (30) flows into the first compartment, and an outlet (50) is provided in the floor of the second compartment. The top edge (52) of the weir terminates below the walls of the mixing chamber such that water overflows from the first compartment into the second compartment, and then into outlet (50). Piping (52) directs the water from outlet (50) into the third mixing chamber (54) which comprises four walls (56) (57) (58) and (59), and floor (60). The open end (61) of inlet piping (62) for pump (64) is positioned in the mixing chamber (54) such that the pump (64) can be used to withdraw water from the mixing chamber. Water pumped from the mixing chamber (54) is directed through pump outlet piping (65) into the elevated reservoir (24).

The top edge (21) of the rear wall (20) in spray chamber (12) terminates lower than the front top edge (26) of the front wall (14), and a paint spray gun (66) is positioned such that paint spray may be directed toward the front wall (14) from a distance of approximately nine inches. The capacity of the recirculating water system is about 14 liters and the recirculation rate is approximately 7.6 liters per minute.

In operation water circulation is begun to provide a curtain of water overflowing from top edge (26) toward floor (22) and passing adjacent to the front wall (14) of spray chamber (12). Paint is then sprayed from spray gun (66) toward the front wall (14) such that the spray becomes entrained in the water curtain. Generally, paint is sprayed at a rate within the range of from about 2.5 milliliters per minute to about 5.0 milliliters per minute, and the spraying continues until about 100 milliliters of paint has been sprayed.

Two series of runs was made using a melamineformaldehyde product available as Deartek 2401 from Dearborn Division, W. R. Grace & Co. (reportedly having a molecular weight of about 10,000 and a charge density of about 2.0 meq/g) and a hydrolyzed polyacrylamide available as Aquafloc 477 from Dearborn Division, W. R. Grace & Co. (reportedly having a molecular weight of about 12 million to 15 million and a charge density of about −0.5 meq/g). The first series of runs used tap water having an alkalinity of about 300 ppm as $CaCO_3$.

In one run, about 800 ppm of the melamine formaldehyde and about 3 ppm of the hydrolyzed polyacrylamide were added to the water. The water was adjusted to a pH of 10 using caustic. After mixing of the treatment, a total of 100 milliliters of high solids enamel clear coat automobile paint which had been prediluted with an organic solvent blend in accordance with standard practice, was sprayed, and the floating solids in the second and third mixing chambers were examined and rated. The solids were found to be completely detackified and were rated excellent.

A second run was made using the same procedure as the first run except that a prediluted brown enamel paint was sprayed and a foam control agent (WW-1406 available from Dearborn Division, W. R. Grace & Co.) was added. The floating solids produced in this run were also found to be completely detackified and were also rated excellent.

A third run was made using the same procedure as the first run except that a prediluted high solid enamel clear coat/red base coat (as a 50:50 mix) paint was sprayed. The floating solids produced in this run were rated good to excellent.

For comparison a fourth run was made using a prediluted high solids enamel clear coat automobile paint and a treatment using about 800 ppm of the melamine formaldehyde resin and about 100 ppm of an aminomethylated tannin (available as Klar-Aid 2400 from Dearborn Division, W. R. Grace & Co). The floating solids were found to be greater than 75% detackified but tackier than the solids produced in the first run, and were rated good to excellent.

Also for comparison a fifth run was made using a prediluted high solids enamel clear coat automobile paint and a treatment using about 1400 ppm of the aminomethylated tannin and about 3 ppm of the hydrolyzed polyacrylamide. The floating solids were examined and found to be less than 50% detackified and were rated poor and inadequate to merit use in the field.

A sixth run was made using the same procedure as the first run except that an industrial glue prediluted with toluene was sprayed into the water and about 5 ppm of the hydrolyzed polyacrylamide was added along with about 800 ppm of the melamine-formaldehyde. Complete detackification was achieved and the results were considered excellent.

A second series of two runs was made using the procedure of the first run above except that distilled water treated with about 800 ppm of the melamineformaldehyde polymer and about 3 ppm of the hydrolyzed polyacrylamide polymer was used in the two runs. In one run of this series a prediluted high solids enamel red base coat was sprayed, and in the other run a prediluted high solids enamel clear coat was sprayed. In both runs of this series the floating solids were found to be completely detackified and accordingly rated excellent.

The prediluted red base coat and clear coat paints were considered, based upon past experience, to be particularly difficult to detackify. It will be evident from the results of this example that the treatment combination of this invention is successful. It is also evident that replacing either of the components with aminomethylated tannin reduced the efficacy in high alkalinity water.

The hydrolyzed polyacrylamide of the combination with the melamine formaldehyde tends to form a large floc which quickly shears. The precise mechanism of operation of this combination is not known. However, without limiting the invention to a particular theory of operation, the melamine formaldehyde may have lipophilic properties which isolates the paint solvents from the paint solids, while the hydrophilic properties of the polyacrylamide disperse the melamine formaldehyde throughout the spray booth water, thus increasing its contact time with the paint.

The second component may also be selected from certain modified tannins in further combination with either certain diallyldialkyl quaternary ammonium polymers or polymers derived by reacting dimethylamine, diethylamine or methylethylamine with an epihalohydrin.

The modified tannin compounds which may be used in this invention are those formed by reacting condensed tannins such as extracts from quebracho wood or wattle bark, which are polyphenolic, with both an aldehyde, particularly formaldehyde, and an amino compound such as monoethanolamine, ammonia, and ammonium salts such as ammonium chloride. The reaction between formaldehyde and amino compounds and a compound, such as a phenolic compound, which contains reactive hydrogen atoms is known as the Mannich Reaction. The molecular weight of the preferred modified tannin materials is considered to be within the range of 5,000 to 50,000. Preferably, the tannin-based materials used in this invention have a charge density of between about 0.7 and about 5.0 milliequivalents per gram (meq/g).

Preferably, the tannin-based component utilized in this invention is made in accordance with disclosure of U.S. Pat. No. 4,558,080, which is hereby incorporated in its entirety by reference. Such a component uses condensed polyphenolic tannins and is prepared under slightly acidic conditions where the pH is less than 7 and where the molar ratio of the primary amine from the amino compound to the tannin repeating unit is from about 1.5:1 to about 3.0:1. To form a tannin-based component having a long shelf life, the reaction mixture is heated at a temperature of from about 150° to about 200° Fahrenheit until a reaction product forms which has an intermediate viscosity within a "key intermediate viscosity range" and the reaction is then terminated by external cooling, by adding quench water, and by adding acid. The "key intermediate viscosity range" is determined experimentally for each flocculant reaction system and is generally within a narrow range between about 2 and about 100 cps when measured at 180° Fahrenheit on a Brookfield LVT viscosimeter. The reaction is terminated by external cooling, by adding quench water, and by adding acid. The solids content of the resultant liquid flocculant is preferably about 20% to about 60% by weight and the pH is preferably less than 3.0. Preferably an antifoamer material such as silicon anti-foamer exemplified by Silicone B made by Dow Chemical Co., a mineral seal oil, or a high molecular weight alcohol is added to prevent excessive foaming.

U.S. Pat. No. 4,558,080 describes the production of a tannin-based flocculant using monoethanolamine as the amino compound and formaldehyde as the aldehyde. As described therein, a reactor containing 130.75 grams of de-ionized water was preheated to 150° F. Gradually 125.75 grams of Mimosa extract, available as a spray-dried tannin powder sold by Canadian Packers, Ltd., was gradually added while stirring. The temperature was maintained at about 130° to 140° Fahrenheit. After complete dissolution, the material was cooled to 110° Fahrenheit. Then 0.15 grams of a silicon antifoamer, Silicone B made by Dow Chemical, was added.

To the aqueous tannin solution, 47.65 grams of monoethanolamine was added to yield a primary amine to tannin ratio of 1.86:1 while mixing, and the temperature of the reaction mixture was allowed to rise to 130° Fahrenheit and it was maintained at this temperature until all of the amine was added. In order to maintain the acid conditions of the reaction mixture 80 grams of a 32% active hydrochloric acid was added to bring the pH in the range of 6.4 to 6.7 and the temperature was allowed to rise to 140° Fahrenheit. Upon forming its initial tannin/amine solution, the mixture was then cooled to 120° Fahrenheit.

Next, the formaldehyde was added in the form of 62.70 grams of 37% active formaldehyde and the temperature during this addition was maintained between 120° and 130° Fahrenheit. As the formaldehyde was mixed with the previous solution the solution was heated to initiate the reaction and the temperature was controlled so that it was not allowed to go above about 180° Fahrenheit. As the reaction proceeded the viscosity of the solution was monitored using a Brookfield LVT viscosimeter where the samples were measured at temperatures of about 178° to 180° Fahrenheit. When the viscosity reading reached 38 to 40 cps, the desired degree of reaction was obtained. At this point, the reaction material was quenched by the addition of external cooling and 45.20 grams of de-ionized water and 7.8 gram of muriatic acid to obtain a final pH of 2.4 and to obtain a solids content of about 40.2% and a final viscosity of 246 cps.

A similar composition produced in accordance with U.S. Pat. No. 4,558,080 was available commercially as the product Klar-Aid 2400 produced by Dearborn Division, W. R. Grace & Co. This composition contained approximately 40% of a modified cationic tannin (mol. wt. about 10,000; charge density about 1.5–4.0) formed as the reaction product of Mimosa extract, formaldehyde, and monoethanolamine.

As indicated above, the second component of the treatment combination of this may also comprise certain polymers derived by reacting dimethylamine, diethylamine, or methylethylamine with an epihalohydrin, preferably epichlorohydrin. Polymers of this type are disclosed in U.S. Pat. No. 3,738,945, which is hereby incorporated herein in its entirety by reference. The preferred molecular weight range is from about 50,000 to 300,000. Preferably, these dialkylamine-epihalohydrin polymers have a charge density of between about 3.0 and 8.0 milliequivalents per gram.

Practice of this embodiment of the invention will be further apparent from the following non-limiting example:

EXAMPLE II

Using the same apparatus as used in Example I two series of runs were made using about 480 ppm melamine formaldehyde (as Deartek 2401) in combination with about 280 ppm aminomethylated tannin (added as Klar-Aid 2400) and about 150 ppm dimethylamine-epichlorohydrin polymer (added as Deartek 2512, available from Dearborn Division, W. R. Grace & Co., and reportedly having a molecular weight estimated as about 200,000 to 300,000 and a charge density of about 6 to 8).

The first series of runs used tap water having an alkalinity of about 300 to 350 ppm as $CaCO_3$ which was adjusted to a pH of 10 using caustic. Eleven runs were made wherein after mixing of the treatment, 100 ml of a high solids enamel paint which had been prediluted with an organic solvent blend in accordance with standard practice, was sprayed and the floating solids in the second and third mixing chambers were examined and rated. Two runs were made using clear coat enamel, and one run each using brown metallic enamel, red metallic enamel, blue metallic enamel, gray metallic enamel, light blue metallic enamel, yellow enamel, white enamel, black enamel, and red enamel. An antifoam was required in each run. The solids were found to be completely detackified in each run.

A second series of two runs was made using deionized water adjusted to a pH of 10 using caustic and a treatment of about 480 ppm melamine formaldehyde, about 280 ppm aminomethylated tannin and about 400 ppm dimethylamine-epichlorohydrin polymer. In the first run, after mixing of the treatment, a total of 100 milliliters of a high solids enamel red base coat automobile paint which had been prediluted with an organic solvent blend in accordance with standard practice was sprayed and the floating solids in the second and third mixing chambers were examined and rated. The solids were found to be less than 50 percent detackified. The second run in the series was made using the same procedure as the first except that a prediluted high solids enamel clear coat was used, and again the solids were found to be less than 50 percent detackified.

As indicated above, the dialkylamine-epihalohydrin polymer used in the second component may be replaced by certain diallyldialkyl quaternary ammonium polymers. These polymers are generally halides, especially chlorides. The preferred diallyldialkyl quaternary ammonium halide polymer is polydiallyldimethyl ammonium chloride such as the diallyldimethyl ammonium chloride polymers disclosed in U.S. Pat. No. 3,288,770 which is hereby incorporated herein by reference. These polymers may be prepared, for example, by polymerizing diallyldimethylammonium chloride monomer, using butylhydroperoxide as a free radical catalyst. Typically, when diallyldimethyl quaternary ammonium polymers are used in accordance with this invention, they have a molecular weight range between about 100,000 and 300,000 and a charge density between about 4.0 and 8.0. One product (charge density about 6.6; molecular weight about 200,000) is available from Dearborn Division, W. R. Grace & Co. as Aquafloc 459.

The combination of the tannin-based component and diallyldimethyl quaternary ammonium polymer to treat water containing paint overspray in accordance with this invention is considered particularly effective when the overspray is a prediluted enamel paint where the water alkalinity is at least about 150 ppm as $CaCO_3$.

However, as with the combinations using dialkylamine-epihalohydrin polymers, these combinations are considered to provide relatively poor detackification in systems having low water alkalinity. This aspect of the invention will be further apparent from the following non-limiting example:

EXAMPLE III

Using the same apparatus as used in Example I a run was made using about 800 ppm of melamine formaldehyde (as Deartek 2401), about 100 ppm dimethyldialkylammonium chloride (as Aquafloc 459), and about 100 ppm aminomethylated tannin (as Klar-Aid 2400). The run used deionized water adjusted to a pH of 10 using caustic. After mixing of the treatment, a total of 100 mililiters of a high solid enamel red base coat automobile paint which had been prediluted with an organic solvent blend in accordance with standard practice was sprayed, and the floating solids in the second and third mixing chambers were examined and rated. The solids were found to be less than 50 percent detackified and were considered inadequate to merit use in the field.

A second run was made using a prediluted high-solids enamel clear coat/red base coat (50:50 mix) and tap water having an alkalinity of about 300 ppm as $CaCO_3$. The floating solids were examined and found to be greater than 75% detackified but tackier than the solids produced in the third run, and were rated good.

It is noted that the tannin-based component used in the examples was not considered a true solution, but more particularly, a hydrocolloidal suspension in which part of the molecule keeps the tannin in solution while the ethercyclic group is hydrophobic. As the water pH is raised above a level of about 6.5, the solubility of the tannin-based component decreases and a small floc is formed. Accordingly, when the combinations employing the modified tannin are used the pH is preferably brought within the range of about 8 to 11 after addition of the tannin to the water of the paint spray apparatus to encourage formation of such a floc. Indeed, it is generally preferred that the paint spray booth water be within this pH range during detackification in accordance with this invention.

With regard to the modified tannin component, it is further noted that while the preferred tannin-based component has been described above, it is understood that other modified tannins may be prepared by aqueous reaction of a tannin with an amino compound and an aldehyde. Mimosa extract is shown above to produce a particularly suitable floc former, but both quebracho extract and wattle extract are preferred from the standpoint of availability and proven suitability as floc-forming reactants. Other suitable tannins can be obtained from various wood and vegetation materials found throughout the world. Tannins are, in fact, a large group of water-soluble, complex organic compounds. Almost every tree or shrub that grows contains some tannins in the leaves, twigs, barks, wood, or fruit. Examples of barks are wattle, mangrove, oak, eucalyptus, hemlock, pine, larch, and willow. Examples of woods are the quebracho, chestnut, oak and urunday.

Examples of fruits are myrobalans, valonia, divi-divi, tara, and algarrobilla. Examples of leaves are sumac and gambier and examples of roots are canaigre and palmetto. The tannin extracts of many of these materials, and in particular the condensed polyphenolic tannin extracts, are thought to be sufficiently reactive to provide adequate flocculant qualities.

The preferred aldehyde for preparing the modified tannin used in this invention is formaldehyde which can be used in the form of 37% active formaldehyde solution. This is also commercially available as formalin which is an aqueous solution of 37% formaldehyde which has been stabilized with from 6–15% methanol. Other commercial grades of formaldehyde and its polymers could be used. Such commercial grades include 44, 45, and 50% low-methanol formaldehyde, solutions of formaldehyde in methyl, propyl, n-butyl, and isobutyl alcohol, paraformaldehyde and trioxane. When using solid paraformaldehyde, care must be taken that it all dissolves.

Other aldehyde containing or generating reactants are organic chemical compounds which contain at least one aldehyde group therein, as are well-known and include, for example, formaldehyde, acetaldehyde, propionaldehyde, glycolaldehyde, glyoxylic acid and the like or polyaldehydes, i.e. organic compounds having more than one aldehyde group in the compound, such as glyoxal, paraformaldehyde and the like. Other suitable aldehyde reactants include aldehyde generating agents, i.e. known organic compounds capable of forming an aldehyde group in site, such as melamine-formaldehyde monomeric products and derivatives such as tri and hexamethylol melamine and the tri and hexa ($C_1$–$C_3$ alkoxymethyl) melamine. Such materials can be formed by known conventional methods. The alkyl blocked derivatives are commercially available, are stable to self-polymerization and are, therefore, preferred.

Particularly preferred are amino compounds that include monoethanolamine, ammonia and water soluble inorganic ammonium salts such as ammonium chloride. Other preferred materials include primary amines such as monoethanolamine, methylamine and ethylamine. Secondary amines and other amine compounds are also acceptable. The primary amines are preferred for preparing the modified tannin since they are the more reactive amines than secondary or tertiary amines.

The diallyldimethyl quaternary ammonium polymer, and the dialkylamine epihalohydrin polymer, particularly when highly charged appear to stabilize the formation of a pin floc provided by the melamineformaldehyde and the tannin-based components, therefore decreasing its size. Without limiting the invention to a particular theory of operation, the addition of the diallyldimethyl quaternary ammonium polymer and dialkylamine epihalohydrin polymer is considered important in certain embodiments of this invention for providing a floc with relatively high surface area and dispersing it. Detackification is thereby improved by facilitating the contact between the floc which is dispersed in water circulating in the paint spray apparatus, and paint which becomes entrained therein. The resulting detackified paint then forms a floating sludge.

Generally, the polymeric product of aldehyde with urea and/or aminotriazine component is added to the paint spray apparatus water at a concentration of at least about 150 ppm, preferably between about 200 ppm and 1000 ppm. The polyacrylamide, when used as the second component, is generally added at a concentration of at least about 1 ppm, preferably between about 2 ppm and about 5 ppm; while the modified tannin together with either the diallyldialkyl quaternary ammonium polymer, or the dialkylamine-epihalohydrin polymer when used as the second component, are generally added at a total concentration of at least about 100 ppm, preferably between about 150 ppm and about 1000 ppm, total. The two components are preferably used in a weight ratio of first component to second component of between about 100:1 and 1000:1 when the second component is the polyacrylamide; and between about 10:1 and 1:10 when the second component is the tannin combination, with the weight ratio of the tannin to the other constituent (i.e. the diallyldialkyl quatenary ammonium polymer or the dialkylamine-epihalohydrin polymer) being from about 10:1 to about 1:2. The first and second components are preferably added separately to the water being treated, with the first component being added before any polyacrylamide is added. When the tannin combinations are used, the tannin is also preferably added separately from the diallyldialkyl quatenary ammonium polymer and the dialkylamineepihalodydrin polymer with the modified tannin being added before the first component and the diallyldialkyl quaternary ammonium polymer or dialkylamineepihalodydrin polymer being added after the first component. However, compositions comprising the combinations of this invention, particularly in the proportions recited above, can be mixed prior to treatment and then used advantageously to treat spray booth wastewater, and accordingly, are considered to be within the scope of this invention. Such compositions typically contain between 1 and 30, preferably between 1 and 10 weight percent, total, of the first and second components of this invention in an aqueous composition. The storage stability of particular compositions of this invention may limit the length of time between mixing of components and effective use.

The combinations of this invention are preferably free of clays so as to avoid dewatering problems associated with clay materials. The combinations of this invention are also preferably free of amphoteric metals, particularly zinc, which provide disposal concerns when the detackified solids are removed from the paint spray facility. Indeed, the preferred combinations of this invention are organic in nature, and may advantageously consist essentially of the first and second components discussed above.

The invention described herein is considered most effective for detackifying high solids enamel paints (both diluted and non-diluted) subject to the water alkalinity limitations discussed above, epoxy resin paints, and also polyurethane paints.

An important benefit of producing detackified paint which floats is that some of the resulting sludges, such as those obtained with certain high solids base coats, are easily dewatered especially if sludge dewatering aids are further added. For example, a sludge containing about 68% solids was mechanically obtained using a laboratory plate and frame press. Nevertheless, following detackification of the water-entrained paint in accordance with this invention, and removal of the detackified particles from the system, as by flotation, further chemical treatment should generally be provided to more efficiently dewater the sludge. For example, for high solids enamel clear coat paint waste, conventional nonionic or anionic polymeric flocculants such as an anionic polyacrylamide polymer can be advantageously used to enhance sludge dewaterability.

The examples described herein include various embodiments of the invention. Other embodiments will be apparent to those skilled in the art from a consideration of the specification or practice of the invention disclosed herein. It is understood that modifications and variations may be practiced without departing from the spirit and scope of the novel concepts of this invention. It is further understood that the invention is not confined to the particular formulations and examples herein illustrated, but it embraces such modified forms thereof as come within the scope of the following claims.

What is claimed is:

1. A method of detackifying spray booth water containing paint particles from paint spray comprising the steps of:
    (a) adding to the spray booth water at least about 150 ppm of a polymer which is a reaction product of an aldehyde with either a urea or an aminotriazine, or both, and which has a molecular weight of at least about 5000;
    (b) adding to the spray booth water at least about 100 ppm total of a modified tannin which is a reaction product of a condensed tannin with both an aldehyde and an amino compound, together with either a diallyldialkyl quaternary ammonium polymer or a polymer derived by reacting dimethylamine, diethylamine or methylethamine with an epihalohydrin;
    (c) providing a pH above about 6.5 in the spray booth water such that the polymer added in step (a) and the modified tannin added in step (b) form a pin floc which is dispersed in the spray booth water for detackification, with the polymer added in step (b) stabilizing said pin floc and improving detackification and (d) separating the floc and paint particles from said spray booth water.

2. The method of claim 1 wherein in step (b) the modified tannin is added together with a diallyldimethyl ammonium chloride polymer in a weight ratio of modified tannin to the diallyldimethyl ammonium chloride polymer of between about 10:1 and about 1:2; wherein the charge density of the polymeric reaction product added in step (a) is between about 1.0 and 25.0 meq/g, the charge density of the modified tannin is between about 0.7 and 5.0 meq/g, and the charge density of the diallyldimethyl ammonium chloride is between about 4.0 and 8.0 meq/g; and wherein the molecular weight of the polymeric reaction product added in step (a) is between about 5,000 and 20,000, the molecular weight of the modified tannin is between about 5,000 and 50,000 and the molecular weight of the diallyldimethyl ammonium chloride is between about 100,000 and 300,000.

3. The method of claim 2 wherein the tannin is added before step (a) and the diallyldimethyl ammonium chloride polymer is added after step (a).

4. The method of claim 3 wherein said modified tannin is a product of a process including the steps of (i) forming an aqueous reaction mixture of the tannin, the amino compound and the aldehyde under slightly acidic conditions where the pH is less than 7 and where the molar ratio of the primary amine from the amino compound to the tannin repeating unit is from about 1.5:1 to 3.0:1; (ii) heating the reaction mixture at a temperature of from about 150° to 200° Fahrenheit until the reaction product forms which has an intermediate viscosity within the range of the system key intermediate viscosity range, said system key intermediate viscosity range being determined through each reactant system as the narrow intermediate viscosity range which permits the resulting product to have a long shelf life, said system key intermediate viscosity range being within the range of from about 2 to 100 cps when measured at a 180° Fahrenheit on a Brookfield LVT viscosimeter; and (iii)

terminating the reaction when the intermediate viscosity has reached the conditions specified in step (ii) and adjusting the solids content of the liquid to about 20 to 60 percent by weight and adjusting the pH to a value of less than 3.0.

5. The method of claim 4 wherein the spray booth water contains particles from epoxy resin or polyurethane paint.

6. The method of claim 4 wherein the spray booth water contains particles from high solids enamel paint and has an alkalinity of at least about 150 ppm as $CaCO_3$.

7. The method of claim 1 wherein in step (b) the modified tannin is added together with a dialkylamine-epihalohydrin polymer in a weight ratio of modified tannin to the dialkylamine-epihalohydrin polymer of between about 10:1 and about 1:2; wherein the charge density of the polymeric reaction product added in step (a) is between 1.0 and 25.0 meq/g, the charge density of the modified tannin is between about 0.7 and 5.0 meq/g, and the charge density of the dialkylamine-epihalohydrin polymer is between about 3.0 and 8.0 meq/g; and wherein the molecular weight of the polymeric reaction product added in step (a) is between about 5,000 and 20,000, the molecular weight of the modified tannin is between about 5,000 and 50,000 and the molecular weight of the dialkylamine-epihalohydrin polymer is between about 50,000 and 300,000.

8. The method of claim 7 wherein the tannin is added before step (a) and the dialkylamine-epihalohydrin polymer is added after step (a).

9. The method of claim 8 wherein said modified tannin is a product of a process the steps of (i) forming an aqueous reaction mixture of the tannin, the amino compound and the aldehyde under slightly acidic conditions where the pH is less than 7 and where the molar ratio of the primary amine from the amino compound to the tannin repeating unit is from about 1.5:1 to 3.0:1; (ii) heating the reaction mixture at a temperature of from about 150° to 200° Fahrenheit until the reaction product forms which has an intermediate viscosity within the range of the system key intermediate viscosity range, said system key intermediate viscosity range being determined through each reactant system as the narrow intermediate viscosity range which permits the resulting product to have a long shelf life, said system key intermediate viscosity range being within the range of from about 2 to 100 cps when measured at a 180° Fahrenheit on a Brookfield LVT viscosimeter; and (iii) terminating the reaction when the intermediate viscosity has reached the conditions specified in step (ii) and adjusting the solids content of the liquid to about 20 to 60 percent by weight and adjusting the pH to a value of less than 3.0.

10. The method of claim 9 wherein the spray booth water contains particles from epoxy resin or polyurethane paint.

11. The method of claim 10 wherein the spray booth water contains particles from high solids enamel paint and has an alkalinity of at least about 150 ppm as $CaCO_3$.

12. The method of claim 1 wherein the reaction product of step (a) has a molecular weight between 5,000 and 20,000.

13. The method of claim 12, wherein the spray booth water contains particles from diluted or non-diluted high solids enamel paint spray.

14. The method of claim 12 wherein the polymer of step (a) and the polymer of step (b) are added as an aqueous composition containing between about 1 and 30 weight percent total of said polymers.

15. The method of claim 12 wherein the spray booth water contains particles from epoxy resin or polyurethane paint.

16. The method of claim 12 wherein no amphoteric metals are added during detackification.

17. The method of claim 12 wherein the spray booth water contains particles from spray of high solids enamel paint diluted with organic solvent.

18. The method of claim 12 wherein the organic solvent includes methylethyl ketone, xylene, toluene, acetone, butanol, or a combination of these.

* * * * *